United States Patent [19]

Shimp

[11] 3,846,675

[45] Nov. 5, 1974

[54] MOLDED CASE CIRCUIT BREAKERS UTILIZING SATURATING CURRENT TRANSFORMERS

[75] Inventor: Alan B. Shimp, Monroeville, Pa.

[73] Assignee: Westinghouse Electric Corporation, Pittsburgh, Pa.

[22] Filed: Jan. 30, 1973

[21] Appl. No.: 327,963

[52] U.S. Cl. .......................... 317/33 R, 317/36 TD
[51] Int. Cl. ............................................. H02h 3/08
[58] Field of Search ..... 317/33 R, 36 TD, 38, 27 R, 317/26, 28 R, 29 R, 46

[56] References Cited
UNITED STATES PATENTS

| | | | |
|---|---|---|---|
| 3,211,958 | 10/1965 | Miller | 317/38 |
| 3,343,084 | 9/1967 | Gambale | 317/36 TD |
| 3,434,011 | 3/1969 | Zocholl | 317/36 TD |
| 3,634,729 | 1/1972 | Hendry | 317/36 TD |

Primary Examiner—J. D. Miller
Assistant Examiner—Patrick R. Salce
Attorney, Agent, or Firm—M. J. Moran; A. T. Stratton

[57] ABSTRACT

A circuit breaker and control system therefor adapted for use in protecting polyphase electrical transmission systems. Saturating current transformers are used to monitor each phase of the polyphase system. The saturating current transformers provide power to the circuit breaker control system. Information concerning the status of the line current in each phase of the polyphase system is provided in one embodiment by separate line monitors which may be, for instance, air core transformers or Hall generators. In another embodiment of the invention, no separate monitors are required for supplying information to the control system concerning the state of the current level in any of the three phases, since the saturating current transformers are used not only to provide energy for empowering or energizing the control system but also for providing the information concerning the status or level of the current in the phases. This is accomplished by obtaining information concerning the first portion of a sinusoidally shaped wave which is then interpreted electrically to predict the value of the peak of that wave even though the transformer may saturate before the peak is reached. The circuit breaker control system is adapted to provide both instantaneous tripping and time delayed tripping.

10 Claims, 15 Drawing Figures

MOLDED CASE CIRCUIT BREAKERS UTILIZING SATURATING CURRENT TRANSFORMERS

CROSS-REFERENCE TO RELATED APPLICATIONS

The teachings of this application are related to the teachings in copending application Ser. No. 327,965, filed Jan. 30, 1973, by Alan B. Shimp and Alfred E. Maier, and copending application Ser. No. 327,973, filed Jan 30, 1973 by Alan B. Shimp, and copending Application Ser. No. 327,972, filed Jan. 30, 1973 by Alfred E. Maier et al.

BACKGROUND OF THE INVENTION

This invention relates to circuit interrupter control systems generally and it has particular relationship to circuit breaker control systems which derive power and intelligence from line sensors.

In the past, multiphase electrical systems have been protected by multipole circuit breakers having control systems which are empowered in most cases by current transformers which monitor the lines of the electrical transmission system to be protected. The information concerning the status of the electrical current in any or all of the lines of the transmission system is provided by the previously described current transformers to the control system. Current transformers therefore not only provide the power or energy for the control system but also provide the intelligence or information necessary to actuate the control system to perform functions which determine the status or control the operation of the circuit breaker.

If the amount of current in any one phase of the electrical transmission system is only slightly larger than normal rated current, the intelligence concerning this is provided by the current transformer monitors to the control system of the circuit breaker and a delayed tripping cycle is begun or initiated whereby the circuit breaker will trip at a predetermined time after the initial sensing of the increase in electrical current in the transmission lines. However, if the current in any of the transmission lines is extremely high due to a short circuit, for example, this information will be similarly provided by way of the current transformer or transformers to the control system whereby the control system will nearly instantaneously react to thereby cause the circuit breaker to trip or open. Since in prior art control systems both information and power are provided by the same current transformer for each phase or line the transformer must be operable over a wide range of electrical conditions. Specifically, this means that the transformer must be non-saturable over a large range of current excursion. It is well known that for current transformers to be operable over a large range of current excursion without saturating, a relatively large magnetic core is necessary for the current transformer. However, this creates a problem of size, bulk and weight. In relatively small circuit breakers which are typically those of the molded case type of circuit breaker, large transformers are limiting when related to the relative size of the breaker. Consequently, it would be desirable to provide energy and information to a circuit breaker control system with relatively small current sensing saturating transformers.

Another problem associated with prior art circuit breaker control systems is calibration. In prior art molded case circuit breakers, calibration is difficult and time consuming and additionally usually requires the passing of relatively high electrical current through the trip unit. The high current heats the trip unit considerably, therefore, time must be allowed between calibrating operations for cooling each trip unit heating element. In addition it is almost always required that a different trip unit be provided when the current rating of the circuit breaker is to be changed. It would be advantageous to provide a circuit breaker control system which may be calibrated by the adjustment of a single dial and implemented with the use of relatively low level current signals which may be provided from a signal generator to certain portions of the circuit breaker control system and which merely simulate the presence of overload current in the transmission line.

SUMMARY OF THE INVENTION

In accordance with the invention, a circuit breaker and control system therefor are provided for protecting each phase of a multiphase or single phase electrical transmission system. In one embodiment of the invention, a saturating current transformer is used to monitor a transmission line for the purpose of providing energy to the control system. The saturating transformer provides electrical energy to the circuit breaker control system until magnetic core saturation occurs after which the energy provided by the current transformer drops to zero. Therefore, for at least the initial portion of every half cycle of alternating current in the transmission line, energy is provided to the control system. The current transformer is connected to a rectifier which is connected to a filter capacitor where the energy is stored, thus providing pulsating direct current to the control system for empowering or energizing purposes. Simultaneously, a current sensor which may be a non-saturating transformer or a Hall generator or an air core transformer provides information or intelligence concerning the status of the peak current level in the line being protected and monitored. When this level reaches a predetermined value, the control system is actuated and the timing unit contained therein either causes the circuit breaker to trip after a certain predetermined delay or causes the circuit breaker to trip instantaneously depending upon the level of the overload current in the line being monitored. This arrangement can be used either on a multiphase or a single phase system. In a multiphase system, each line conductor is monitored by one energy providing or empowering saturating transformer and one current sensor. In a three-phase system, for example, three saturating transformers are employed for providing power and three current sensors for providing information. In each case, the three current sensors are connected to an auctioning circuit and the three empowering transformers are connected to an auctioning circuit thus providing a single signal to the control system and a single empowering level to the control system. In other words, the highest value of current in any of the three phases will provide the information signal and empowering energy in each case.

In one embodiment of the invention, a timing unit which may be adapted to cause the circuit to trip instantaneously or after a desired delay, is connected in emitter follower relationship to a Darlington pair transistor arrangement where the energizing or empowering signal from the auctioned saturating transformers is provided between the collector of the Darlington pair and the low side of the timing unit. The intelligence signal is provided between the base of the Darlington pair and the low side of the timing unit. Consequently, the undesirable ripple characteristics of the pulsating direct current from the auctioned energizing transformers is absorbed between the collector and emitter of the Darlington pair, while the timing unit which is connected in emitter circuit relationship follows the voltage of the auctioned intelligence signal.

In another embodiment of the invention, the auctioned intelligence signal is provided to the end terminals of a potentiometer. The wiper of the potentiometer is connected to the base of the previously mentioned Darlington pair. This provides an adjustment capability for calibrating the tripping characteristics of the circuit breaker.

In still another embodiment of the invention, the previously described calibration technique may be simplified by providing a relatively low level voltage signal at the input terminals of the potentiometer. This signal provides the equivalent effect of an overload current in the line. This voltage, which can be made to simulate an overload current condition, can be applied as an input signal to the Darlington pair by merely adjusting the wiper of the potentiometer to which the signal is applied. Consequently, for any predetermined level of electrical current in the transmission lines, the circuit breaker can be easily and conveniently calibrated for tripping.

In another embodiment of the invention, a single saturating current transformer for phase or line is used for simultaneously providing both energy and an information signal to the trip unit. This means that only one transformer need be employed for one phase or one line of an electrical transmission system rather than one energy producing transformer and one current sensing means per phase. The saturating current transformer provides energy for empowering the control system for the circuit breaker in a manner similar to that previously described with respect to the other embodiments of the invention, and provides intelligence or information to the electrical circuitry of the control system for determining or controlling when a trip operation occurs. This is accomplished by utilizing the initial portion of a sinusoidally shaped wave which contains sufficient information to extrapolate or project the peak value of that sinusoidally shaped wave. Consequently, the information supplied to the control system before saturation of the current transformer or transformers of any half wave of electrical current flowing in the lines being monitored contains sufficient information to cause either an instantaneous or delayed tripping of the circuit breaker without the necessity of actually monitoring the undistorted peak portion of that wave. It has been found that the rate of change of current or voltage in the first portion of a half cycle of a sine wave contains information sufficient to predict what the maximum or peak value of that sine wave will be during the remainder of that half cycle. This is because the peak output voltage attained in any one cycle by the saturating transformers before saturation is related to the square root of the peak value of current flowing in the transmission line. An electronic control circuit is provided in the overall control circuit which utilizes this information for projecting the presence of an overload condition of any magnitude on the line.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENTS

Figure 1:
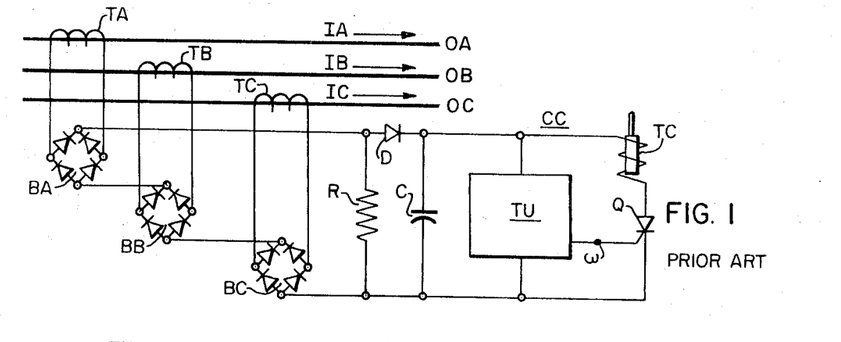
FIG. 1 is a block diagram of a three phase prior art circuit breaker control system.

Referring now to the drawings and to FIG. 1 in particular, a typical prior art control circuit CC is shown. The transmission lines of a three phase electrical system $\phi A$, $\phi B$ and $\phi C$ are shown. Electrical currents IA, IB and IC are shown flowing in the three previously mentioned phase conductors respectively. Non-saturating electrical current transformers TA, TB and TC are shown monitoring the three previously mentioned electrically conducting leads respectively. Current transformer TA is connected to the input terminals of a full wave bridge rectifier BA, current transformers TB is connected to the input terminals of a full wave bridge rectifier BB and current transformer TC is connected to the input terminals of a full wave bridge rectifier BC. The output terminals of the three previously described full wave bridge rectifiers are connected in series circuit relationship across an input resistor R of a control circuit CC. Connected to the upper terminal of resistor R is a diode D, the cathode of which is connected to one side of a capacitor C, which is connected at its other end to the bottom terminal of resistor R. Diode D and capacitor C act as a filter means for the output signal of the three serially connected full wave bridge rectifiers. Connected across the capacitor C are the terminals of a trip element or trip unit TU. Connected in parallel with these terminals is the series combination of a trip coil TC for a circuit breaker (not shown) and a silicon controlled rectifier or similar gated device Q. The gate of the silicon controlled rectifier Q is connected to the output terminal U of the trip unit TU.

In operation, each current transformer has an output current which is proportional to its primary current; that is, IA, IB, or IC. The full wave bridge rectifiers and resistor R are arranged so that at every instant, the voltage across R is proportional to the highest of the three line currents. Capacitor C will charge to a voltage equal to that of the peak voltage. Trip element TU may be an electronic circuit which is sensitive to or responds to the voltage impressed across capacitor C. If the voltage is higher than a predetermined value (usually a voltage corresponding to 100–120% of rated current), the trip unit will actuate the gate of the silicon controlled rectifier Q to thereby energize trip coil TC thus actuating the circuit breaker to an open position and interrupting the overload current.

The current transformers TA, TB and TC must be non-saturating over a wide range of line currents so that power for energizing the trip coil TC and energizing the electrical components of the trip element TU is always available. In addition, the information or intelligence provided to the tripped element TU to cause actuation or energization of the silicon controlled rectifier Q must also be obtained from the same transformer or transformers. In prior art control circuits of the type shown in FIG. 1, non-distorting or non-saturating transformers must be used so that the peak line current may be reflected into the control system as a proportional change in voltage across the capacitor C to thereby cause trip element TU to respond thereto and thus actuate silicon control rectifier Q to a conducting state either instantaneously or after an appropriate time delay. The time delay is dependent upon the magnitude of the previously described over-current.

Figure 2:
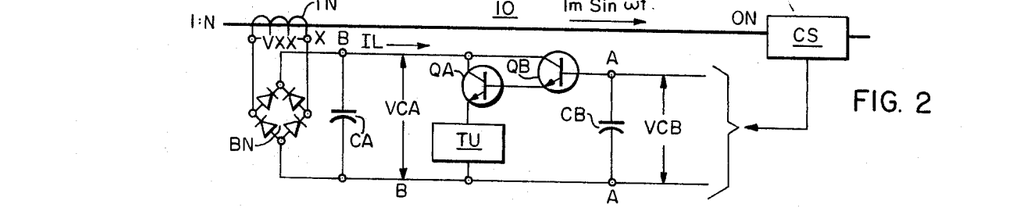
FIG. 2 is an electrical schematic diagram of one embodiment of a single pole circuit breaker control system using a saturating transformer and a current sensor.

Referring now to FIG. 2, a single pole or single phase monitoring system 10 embodying the teachings of this invention is shown. It is to be understood that the principle to be described with respect to monitoring system 10 could equally apply to a multiphase monitoring system and the choice of a single phase or a single line transmission system is chosen merely for the purpose of simplicity in explanation. In this case, transmission line $\phi N$ carries or conducts an electrical current IM sin $\omega t$. IM represents the maximum value of the current during a halfwave. As can be easily understood, the value of IM will change depending upon the RMS value of electrical current flowing in the line $\phi N$ (not shown). In an ideal situation, IM is equal to or related to the rated current. In other situations, IM may increase to a value which is equal to or related to 120% to 150% of rated current and in still other situations IM may be significantly larger than rated circuit breaker current. In the latter case, this may cause an instantaneous tripping operation of the circuit breaker utilized in protecting the electrical circuitry connected to the transmission line $\phi N$. Transmission line $\phi N$ has two circuit elements associated therewith. One is a saturating current transformer TN which has a turns ratio of 1:N. Saturating current transformer TN has output terminals X—X connected to the input terminals of a full wave bridge rectifier BN, the output terminals of which are connected across a filtering or storage capacitor CA. The output terminals of the storage capacitor are designated b, b. The voltage across capacitor CA is designated VCA and the current flowing out of the top portion of capacitor CA during a discharging operation is designated IL.

Also connected to the transmission line, lead or conductor $\phi N$ is a device generally designated as a current sensing device or transformer CS. Current sensing device CS is adapted to provide an output signal voltage VCB which is proportional to the input current or the current flowing in line $\phi N$ otherwise known as IM sin $\omega T$. When current IM sin $\omega t$ is flowing in line $\phi N$, the voltage produced at the output terminals of the current sensor CS is also generally sinusoidally shaped or has the shape of a rectified sine wave. The voltage VCB is impressed across the terminals A—A of an input capacitor CB. The capacitor CB is connected at the upper terminal thereof to the base of one transistor QB of a Darlington pair combination comprising two transistors QA and QB. The lower side of capacitor CB is connected to the lower end or terminal of a timing unit TU. The other end of timing unit TU is connected to the emitter of transistor QA of the previously described Darlington pair combination. The collectors of the previously described Darlington pair combination are connected to the upper output terminals of the previously described capacitor CA so that current IL flows into the collectors of the Darlington pair combination. The collector of transistor element QA is connected to the previously described upper terminal b out of which current IL flows and is also connected to the collector of transistor QB. The emitter of transistor QA is connected to the other side of the previously described timing unit TU. The emitter of the transistor QB is connected to the base of the transistor QA thus forming the well known Darlington pair combination or transistor configuration. The base of transistor QB, as was described previously, is connected to the upper side of the capacitor CB. In this particular embodiment of the invention, the lower terminal B of the capacitor CA is electrically at the same potential as the lower terminal A of the capacitor CB.

Figure 3:
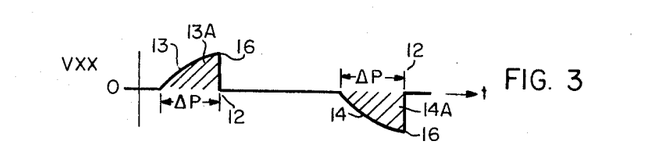
FIG. 3 is the voltage wave shape measured at points XX of the saturating transformer of FIG. 2.
Figure 4:
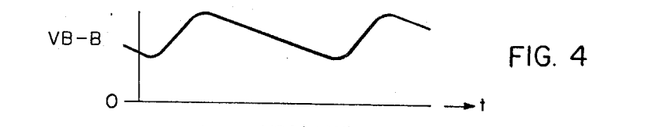
FIG. 4 is the voltage wave shape at points BB of the electrical circuit shown in FIG. 2.

In operation, circuit 10 can best be described by reference to FIGS. 3 and 4 in addition to FIG. 2. Assuming that the current flowing in line conductor $\phi N$ is sinusoidally shaped, then the current may be described by mathematical designation IM sin $\omega t$. As can be seen by reference to FIG. 3, at low values of line current, the current transformer TN will generally faithfully track or produce a voltage VXX which is proportional to the current IM sin $\omega t$. However, as the instantaneous value of line current approaches the peak of the current wave, the current transformer TN will most likely saturate as indicated at 12 on the graph of FIG. 3. When the current transformer TN saturates, the voltage VXX produced across terminals X—X will drop to zero immediately, even though the instantaneous value of the current in the line $\phi N$ continues to approach a peak value IM. When the instantaneous value of the current of the sinusoidally shaped current in the line or lead φN approaches zero, and begins to reverse itself as is commonly the case in an alternating current line the hysteresis effect of the magnetic core of the saturated transformer TN will be reversed and a similarly shaped pulse 14 will be generated but in the opposite direction. Since saturation in transformers is measured in terms of volt-seconds, it can generally be said that the higher the value of peak current IM in the line φN, the higher the peak voltage 16 in the pulses 13 and 14 as shown in FIG. 3 and the narrower the pulse widths ΔP will be. This maintains the areas 13A and 14A under the curve of either pulse 13 or 14 substantially constant. That area is designated by the cross hatched lines of the pulses 13 and 14. As the pulses 13 and 14 and any similar pulses in a train of pulses are supplied to the input terminals of the full wave rectifier BN, the right-most pulse 14 as shown in FIG. 3 is rectified and reversed so that pulses 13 and 14 at the output terminals b, b of the rectifier BN are oriented in the same direction or of the same polarity. These pulses are then supplied to the filtering capacitor CA whereupon the output voltage VCA is as shown in FIG. 4. This output voltage is pulsating unidirectional or direct current voltage.

Figure 5:
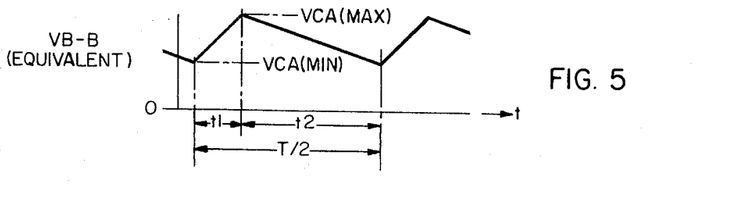
FIG. 5 shows a mathematical simulation of the voltage wave shape shown in FIG. 4.

By referring to FIG. 5 a voltage waveshape VBB equivalent can be seen. The period of the saw-toothed shaped cycle is designated T/2 with the time between the voltage rise from the lowest to the highest value being designated t1 and the time of the voltage drop from the highest value to the lowest being generally designated t2. The voltage of the lowest value is designated VCA (MIN) and the voltage of the highest value or point is designated VCA (MAX). The shape of the curve in FIG. 5 is helpful for mathematical determination of the values of the various elements in the circuit of FIG. 2.

The Darlington pair emitter follower combination of FIG. 2 is useful in that the ripple shown in the voltage VBB of FIG. 4 is dropped across the collector to emitter of the transistor QA of the Darlington pair combination. Consequently, the voltage between the emitter of the Darlington pair combination and the low side of the timing unit TU generally tracks or follows the voltage across the capacitor CB faithfully. This means that the voltage across the timing unit TU is generally proportional to the maximum value of the line current IM sin ωt as measured by the current sensor CS. Consequently, as the value of line current changes or the voltage across the timing unit TU will change generally proportionally and either an instantaneous tripping operation or a time delay tripping operation will occur. The circuit 10 of FIG. 2 allows for the use of a relatively small, light weight, saturating current transformer TN for providing energy for empowering or energizing the electronic components of the circuit 10, while a current sensor CS which may be a non-saturating transformer or a similar current sensing device need only provide the intelligence data which eventually causes a circuit breaker not shown, to trip. Since unit CS need not provide power but only a generally small energy signal proportional to the current flowing in line φN, it need not be a large current transformer even though in this embodiment of the invention it is non-saturating.

Figure 6:
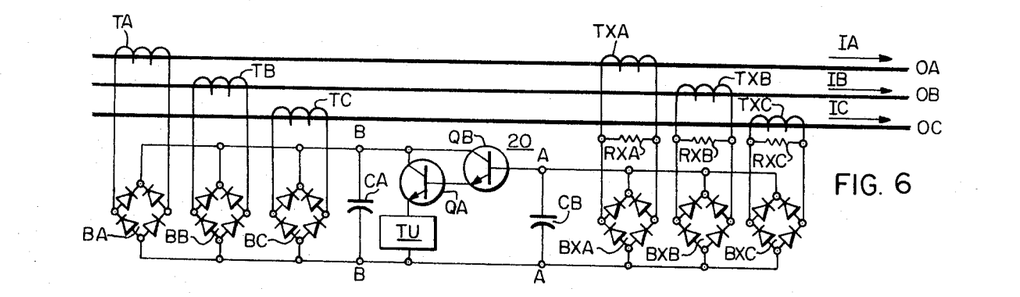
FIG. 6 shows an embodiment of the invention in which a control system for an electrical circuit breaker for protecting a three phase electrical circuit is used and in which saturating transformers and air core current monitoring transformers are used.

Referring now to FIG. 6, an electrical circuit 20 similar to electrical circuit 10 shown in FIG. 2 is depicted. Electrical circuit 20 comprises complementary pairs of transformers, one transformer in each pair being necessary to provide energy to the circuit 20 and the other transformer being available to provide information or intelligence to the circuit 20. The splitting of the energization and intelligence operations allows for a reduction in the overall size of the transformer devices necessary to monitor lines or leads in an electrical system. In this particular embodiment, it will be noted that a three phase electrical system is being protected. The three phases are generally designated φA, φB, φC having electrical currents flowing in them respectively designated IA, IB and IC. Empowering or saturating current transformers TA, TB and TC monitor the three phases φA, φB, and φC, respectively, and in a simpler manner non-saturating air core transformers TXA, TXB and TXC respectively provide the information signal to the unit 20. Transformers TA, TB and TC have shown connected across the output terminals thereof fixing resistors RA, RB and RC respectively for the saturation level of the transformers. The information or intelligence monitoring transformers TXA, TXB and TXC are connected respectively to the input terminals of full wave bridge rectifiers BXA, BXB and BXC. The output terminals of these three rectifiers are connected in parallel across the terminals AA of a capacitor CB. Similarly, the saturating power supply transformers TA, TB and TC respectively are each connected across the input terminals of three full wave rectifiers BA, BB and BC, respectively, the output terminals of which are connected in parallel across the input terminals bb of a filtering or storage capacitor CA. The previously described Darlington pairtiming unit circuit arrangement is connected between the terminals bb and AA in the same manner as described with respect to FIG. 2. Consequently, if the current in any one of the three phases φA, φB or φC increases to an overload condition or to any predetermined level or condition above rated current, the pair of transformers associated with that line will provide information and energy to the respective full wave bridge rectifiers thus causing the circuit 20 to respond to ultimately trip a circuit breaker (not shown) in a manner previously described with respect to FIG. 2.

Figure 7:
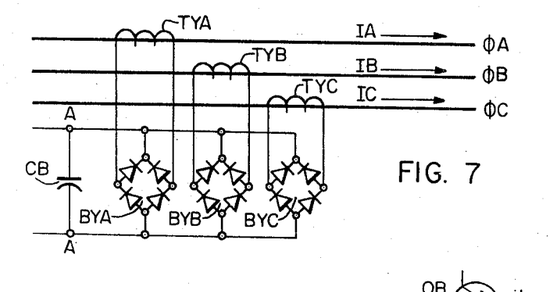
FIG. 7 shows an embodiment of the invention in which saturating transformers are used in place of the air core transformers shown in FIG. 6.

Referring now to FIG. 7, a portion of a circuit breaker control system such as shown in FIG. 6 is depicted in which saturating information or intelligence transformers TYA, TYB and TYC replace the previously described non-saturating transformers TXA, TXB and TXC respectively for monitoring the information on lines φA, φB and φC respectively which carry currents IA, IB and IC respectively. It will be noted that the three previously described saturating transformers provide their output energy to the input terminals of three rectifier units BYA, BYB and BYC respectively, the output terminals of which are connected across the previously described storage capacitor CB at the terminals AA. In this case, the information supplied at the terminals AA is saturated intelligence or information having a shape similar to that shown in FIG. 4, the use of which will be described later.

Figures 8, 9, 9A, 9B, 10:
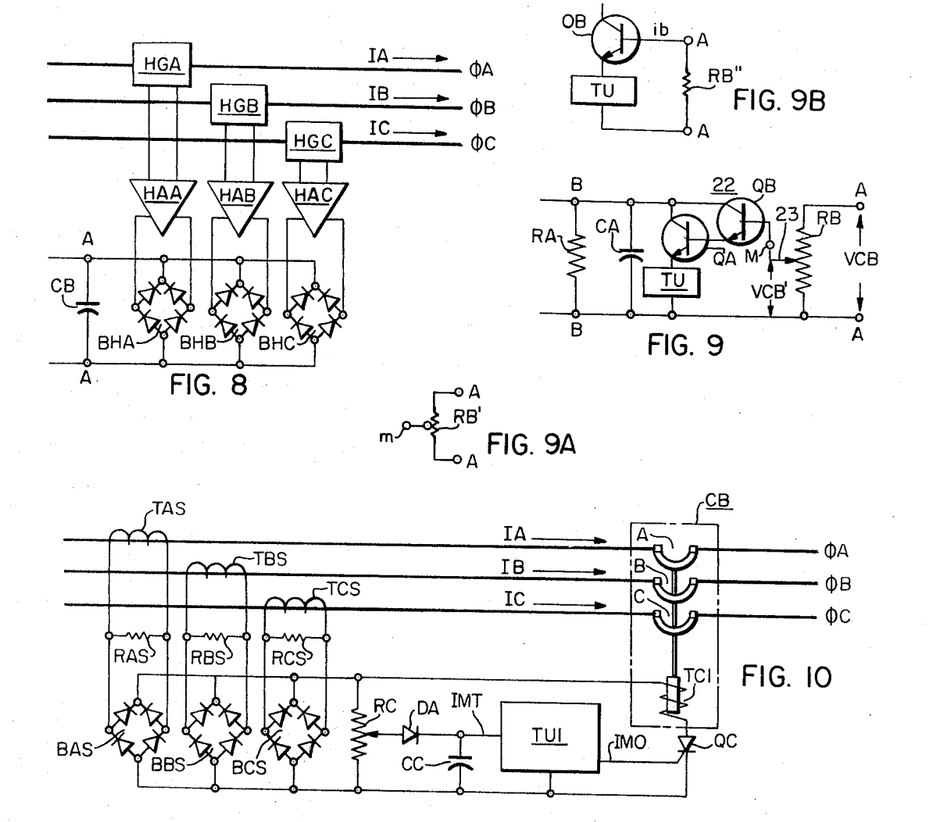
FIG. 8 shows a schematic of an embodiment of the invention in which Hall Generators are used in place of the air core transformer monitors of FIG. 6.
FIG. 9 shows an embodiment of the invention in which a calibration potentiometer is used.
FIG. 9A shows an embodiment of the invention in which a variable plug in resistive element is used.
FIG. 9B shows an embodiment of the invention in which a non-variable or fixed plug in resistor is used.
FIG. 10 shows an embodiment of the invention in which a single saturating transformer per pole of circuit breaker is used for supplying both energy and information to the trip circuit.

Referring now to FIG. 8, still another embodiment of the intelligence gathering portion of the circuit of FIG. 6 is depicted in which Hall current generators generally designated HGA, HGB, and HGC for lines or leads φA, φB and φC, respectively, provide generally linear representations of the currents flowing in the aforementioned leads to amplifiers designated HAA, HAB and HAC, respectively, the outputs of which supply current to rectifiers BHA, BHB and BHC respectively. The outputs of the three previously described rectifiers are connected in parallel across the capacitor CB at terminals or junctions AA, as shown in FIG. 6. The Hall Generators have the particular property of faithful reproduction of the signal being sensed.

Referring now to FIG. 9, an electrical circuit 22 similar to the circuit shown in FIG. 6 between the complementary terminals b,b and AA is depicted. Of importance with respect to FIG. 9 is the placement of a potentiometer or variable resistance means RB between the terminals AA at which the voltage VCB from the output of the sensor which provides intelligence to the timing unit is applied. The voltage VCB' between the wiper 23 of the potentiometer RB or point M and the lower side of timing unit TU represents the voltage which is supplied to the Darlington pair combination comprising transistors QA and QB and the emitter connected timing unit TU. This means that regardless of the rating of the circuit breaker to be actuated by the timing unit TU or the rating of the line which is monitored by the various sensing devices, a single control system may be used for all ratings. All that is required is the introduction of a calibration signal at the terminals AA which is representative of the output voltage VCB' during predetermined overload conditions and the adjustment of the potentiometer wiper 23 so that tripping may occur when desired. The resistor RB may also be a fixed replaceable tapped resistor where the tap lead is intermediate to the end terminals.

Referring now to FIG. 10, a three-phase electrical system generally designated by the leads, lines or conductors $\phi A$, $\phi B$ and $\phi C$ is protected by a circuit breaker CB having separable main contacts or poles A, B and C, respectively. Circuit breaker CB has a trip coil TC1 which is connected in series circuit relationship with a silicon controlled rectifier or similar gated controlled device QC so that when the silicon controlled rectifier or similar device is actuated to a conducting state, trip coil TC1 is energized, thus causing the previously described contacts or poles A, B, C to open thus disconnecting portions of the previously mentioned electrical transmission system. Currents IA, IB and IC may flow in the leads $\phi A$, $\phi B$ and $\phi C$. The three phase transmission system is monitored by saturating current transformers TAS, TBS and TCS for lines or leads $\phi A$, $\phi B$ and $\phi C$, respectively. The saturating current transformers have saturation level fixing resistances RAS, RBS and RCS, respectively. The output terminals of the three previously described current monitoring saturating transformers TAS, TBS and TCS are connected to full wave bridge rectifiers or similar rectifying means BAS, BBS and BCS, respectively. As was previously described with respect to other figures showing embodiments of this invention, the output terminals of these three rectifiers or units are connected in parallel across an input resistor or potentiometer RC. The wiper or movable arm of the potentiometer RC is connected to the anode of a diode DA, the cathode of which is connected to the top of a storage filtering capacitor CC. The lower terminal of capacitor CC is connected to the lower terminal of the potentiometer RC. A timing circuit TU1 similar to the timing circuit TU shown in other Figures embodying teachings of this invention is connected at its input between the lower side of the charging capacitor CC and an input terminal IMT. The output terminal IMO of the circuit TU1 is connected to the gate of the previously described silicon controlled rectifier or similar means QC. The components and connections of the various electronic elements of the trip circuit or timing circuit TU1 will be described hereinafter in connection with FIG. 11.

I have found that I can use a saturating transformer to accomplish both the previously described functions of empowering or energizing a control system and providing intelligence or information thereto relative to the control of tripping. I have found that for sinusoidally shaped waves, such as currents IA, IB and IC in the previously described three phase electrical system, by merely knowing the shape of the sinusoidal waves during a portion thereof, namely the first portion, I can predict or extrapolate therefrom and electronically arrive at or mathematically calculate what the peak value of current will be. It is to be understood that this projected peak value of current is determinative of when tripping of the circuit breaker CB should occur. Generally, the prediction of the peak of the sinusoidal waves is possible by knowing the rate of change of current with respect to time at the first portion of the wave near the zero crossing which note is known as $di/dt$. I have found that if the waves are in fact sinusoidally shaped and the magnetic core of the current transformers comprise or are formed from generally square hysterisis loop material that the peak of the voltage curve or pulse created at the output terminals thereof such as shown in FIG. 3 and generally designated 16 is proportional to the square root of the peak current value of the or said another way is related to the highest value of the instantaneous current during a half cycle, if the wave is sinusoidally shaped. This is because the volt second characteristic or the shaded area under the pulse of FIG. 2 must always be the same for a saturated transformer. Knowing this value and adjusting the potentiometer wiper of the varible resistance means RC and carefully picking or selecting the components of the trip unit TU1. I can cause the circuit breaker CB to trip either instantaneously or after a predetermined time delay by using a single transformer per pole which provides both information and energy and I can do this over a wide range of currents without necessitating using the actual currents IA, IB and IC for calibration purposes.

In FIG. 9A, a plug in resistor RB' is shown which may have a fixed or predetermined value and which may be substituted for resistor RB by plugging it in between points or terminals AA and M OF FIG. 9.

Referring now to FIG. 9B, if a fixed value plug in resistor RB'' is placed between terminals AA, the circuit will act the same as if the wiper of resistor RB of FIG. 9 was fully extended to the top of resistor RB. All the available current from the bridge networks BYA, BYB and BYC of FIG. 7 for example will flow into the base of transistor QB as base current ib and will quickly saturate the Darlington pair and cause energization of the trip unit TU. This provides a fail safe circuit.

Figure 11:
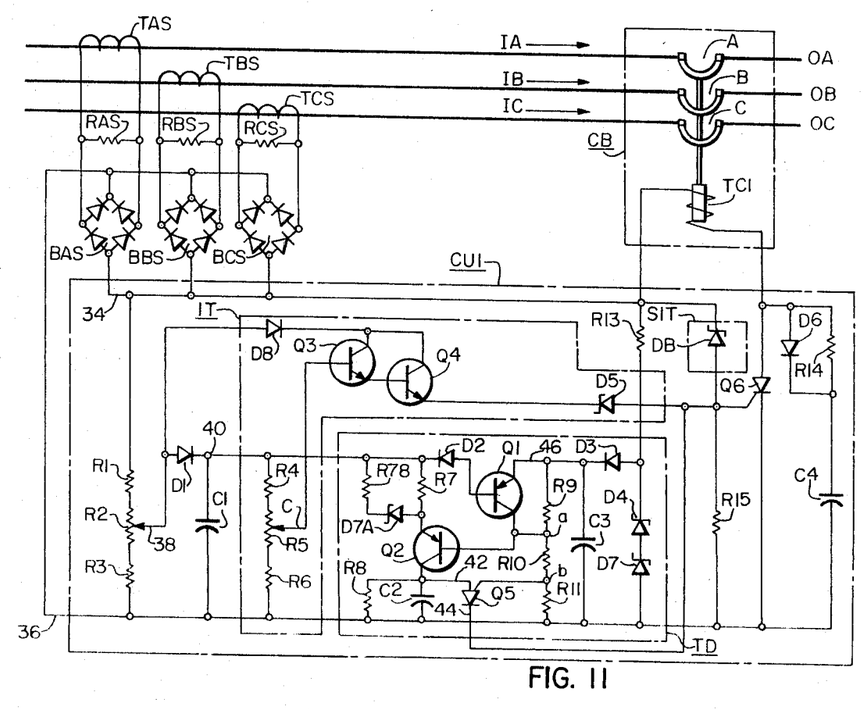
FIG. 11 shows a circuit breaker control system as in FIG. 10 but with the components for the control system specifically shown.

Refer now to FIG. 11 Control Unit CU1 in this embodiment of the invention comprises a solid state trip circuit. The solid-state trip circuit comprises among other things a time delayed trip circuit TD, and an instantaneous trip circuit IT and a super instantaneous trip circuit SIT. The upper and lower output terminals of the previously mentioned full wave bridge rectifiers are designated 34 and 36, respectively, with terminal or lead 36 being generally connected as a system common terminal and terminal or lead 34 being generally connected as the system signal terminal. Connected across terminals 34 and 36 are three serially connected resistive elements or resistors R1, R2 and R3. Resistive element or potentiometer R2 has a movable wiper or arm 38 which is connected to the anodes of diodes D1 and D8 the cathode of the latter being connected to the collectors of two transistors Q3 and Q4 which are connected in Darlington pair relationship. The cathode of diode D1 is connected to a line or terminal 40. Connected between terminal 40 and terminal 36 is a capacitive element or capacitor C1.

The instantaneous trip circuit IT of the solid state control unit CU1 comprises three resistive elements R4, R5 and R6 connected in parallel with capacitor C1, or between terminals 40 and 36. Resistive element R5 comprises a potentiometer having a movable wiper member C. Movable wiper C is connected to the base of transistor Q3 of the previously mentioned Darlington pair arrangement or combination. The emitter of transistor Q3 is connected to the base of transistor Q4, while the base of transistor Q4 is connected to the referencing side of a Zener diode or voltage regulation element D5. The other side or anode of voltage regulation element D5 is connected to the gate of a silicon controlled rectifier or similar gated means Q6 and to the output terminal of the time delay portion TD of the solid state control unit CU1.

The time delay portion TD of the solid state control unit CU1 comprises a resistor R7 which is connected at one end to terminal 40 and at its other end to the emitter of a transistor or similar solid state element or gated valve Q2. The collector of gated valve Q2 is connected to one end of a resistor R8, to one end of a timing capacitor C2 and to the anode terminal 42 of a unijunction transistor Q5. The cathode terminal 44 of unijunction transistor Q5 is connected to the previously mentioned gate of the silicon controlled rectifier Q6 and thus comprises the output terminal for the time delay means TD. The time delay means additionally comprises a diode D2 having the cathode thereof connected to the previously mentioned terminal 40. The anode of diode D2 is connected to the base of a PNP transistor Q1 whose collector is connected concurrently to the base of the previously mentioned PNP transistor Q2 and to a junction point $a$ in a serially connected voltage divider network comprising resistive elements R9, R10 and R11 where junction point $a$ is the junction point between resistors R9 and R10. A junction point $e$ exists between the resistive elements R10 and R11. Junction point $e$ is connected to the gate terminal of the previously mentioned unijunction transistor Q5. The lower end of the voltage divider network comprisng resistors R9, R10 and R11 or said in another way the terminal of resistor R11 opposite junction point $e$ is connected to terminal or lead 36. The other end of the previously described voltage divider network is connected to the emitter of the previously mentioned transistor Q1. This terminal is designated 46. Connected between terminals 46 and 36 is a capacitive element or capacitor C3. The capacitive element C3 therefore is connected in parallel with the network which includes the three serially connected resistors R9, R10 and R11. Also connected to junction or terminal 46 is the cathode of a diode D3, whose anode is connected to the upper side or regulating side of a zener diode D4. The anode of zener diode D4 is connected to the cathode or regulating portion of another zener diode D7, whose anode is connected to terminal or line 36.

Connected to the anode of diode D3 and the regulating portion of zener diode D4 is one end of a resistive element or resistor R13, whose other end is connected to trip coil TC1 of circuit breaker CB and line 34. The other end of trip coil TC1 is connected to one end of a resistor R14, to the anode of a diode D6 and to the anode of the previously described silicon controlled rectifier Q6. The gate of the previously described silicon controlled rectifier Q6, in addition to being connected to the cathode of unijunction transistor Q5 and the anode of zener diode D5, is connected to a resistor R15, whose other end is connected to the terminal or line 36. The cathode of silicon controlled rectifier Q6 is also connected to terminal or lead 36. Connected to the cathode of diode D6 and the other end of resistor or resistive element R14 is one side of a capacitor C4. The other side of the capacitor or capacitive element C4 is connected to the previously mentioned terminal or system common lead 36.

The super instantaneous trip cicuit or portion SIT of the solid state trip circuit T1 comprises the zener diode DB. The regulating side of Zener diode DB is connected to the terminal or lead 34 and the anode thereof is connected to the gate of the silicon controlled rectifier Q6.

The time delay portion TD of the previously described solid state control unit CU1 is actuated to trip the circuit breaker CB in a range of currents for any of the phases $\phi A$, $\phi B$ or $\phi C$ which is approximately 120% to 1,000% of rated current. The instantaneous trip circuit IT is capable of actuating circuit breaker CB to an open position in the range of overcurrents, in phases $\phi A$, $\phi B$ and $\phi C$ of 500% to 1,000% and the super instantaneous trip circuit SIT is capable of causing circuit breaker CB to trip in the range of overload current of 1,000% or more. The time delay TD circuit may delay tripping of the circuit breaker CB for as much as five to ten minutes typically or even more after an overload current is sensed. The instantaneous trip circuit IT will actuate tripping of circuit breaker CB within a few cycles. Super instantaneous trip circuit SIT will actuate tripping of circuit breaker CB within a cycle of the current, flowing in IA, IB or IC phases or lines $\phi A$, $\phi B$ or $\phi C$, respectively.

THE OPERATION OF THE SOLID STATE CONTROL UNIT CU1

As described previously, a voltage is impressed across terminals 34 and 36 which is proportional to the square root of the highest current in any of the phases or lines $\phi A$, $\phi B$ or $\phi C$. This voltage is impressed across the voltage divider network or combination including the serially connected resistors R1, R2 and R3. A voltage is therefore produced between the wiper or arm 38 and the lead 36 which is proportional to the square root of the highest current in the lines as previously described. The voltage at terminal 38 is applied through forward biased diode D1 to terminal or lead 40 where it is impressed across the capacitor C1. Said in another way, capacitor C1 may be charged by current flowing out of the wiper 38 and through diode D1 to a voltage which is proportional to the square root of the highest line current.

OPERATION OF THE TIME DELAY CIRCUIT TD

As long as the current in the lines IA, IB or IC flows, a reference voltage is sustained or developed across the zener diodes D4 and D2. This reference voltage is provided by supplying current from line 34 through resistor R13 to the two previously described zener diodes D4 and D7. Consequently, a relatively fixed or predetermined voltage is impressed across the circuit which includes diode D3 and the capacitor C3, or said in another way, between the terminal 46 and the terminal 36. At less than 100 % rated current in any of the lines IA, IB or IC, the voltage impressed across capacitor C1 or between lines 40 and 36 which may be called the intelligence or information signal or voltage is smaller than the voltage impressed across the capacitor C3. Consequently, diode D2 is forward biased and the emitter to base junction or transistor Q1 is forward biased and transistor Q1 is saturated or conducts thus substantially shorting out resistor R9. Such being the case, the voltage between the emitter and base of the transistor Q2 is sufficient to reverse bias that junction and cause transistor Q2 to be substantially non-conducting or cut off. However, when the line current slightly exceeds 100% of rated current or said in another way when any of the currents in leads or conductors φA, φB or φC is slightly greater than rated current, the transistor Q1 will be caused to turn off because the voltage at line 40 will become higher than the voltage at line 46 thus reverse biasing the emitter to base junction of transistor Q1. When this happens, resistor R9 is no longer short circuited and the voltage at the base of transistor Q2 decreases to the voltage at junction point a. This will be less than the voltage on line 40 and consequently, transistor Q2 will conduct. Then the existence of the potential or voltage across capacitor C1 or between lines 40 and 36 causes current to flow through resistor R7, through the conducting transistor Q2 and into capacitor C2. It being noted that unijunction transistor Q5 is substantially non-conducting at this point and resistor R8 is significantly larger in impedance than the impedance of capacitor C2. Because of the base drive current present at the base of transistor Q2, the current flowing through resistor R7 and charging capacitor C2 is essentially constant assuming that the overload current remains at substantially the same level during the charging of said capacitor. It is well known that constant current flowing into a capacitor provides a linear increase in voltage across the capacitor which is proportional with time to the amplitude of the current charging the capacitor. Since the amplitude of the current charging the capacitor is proportional to the voltage across the capacitor C1, and since the voltage across the capacitor C1 is proportional to the square root of the highest value of current in any of the phases φA, φB or φC, then the voltage across the capacitor C2 is proportional to the square root of the current flowing in any of the above-mentioned phases. Said in another way, if the peak value of any of the currents flowing in the lines φA, φB or φC changes from one level to another level, then the voltage drop across the capacitor C2 will increase linearly with respect to time in proportion to the square root of the highest current flowing in the lines to be protected by the circuit breaker. When the voltage drop across the capacitor C2 reaches the triggering level of the unijunction (UJT) transistor Q5, or said in another way, when the voltage on the anode terminal 42 of the UJT-Q5 exceeds the voltage on the gate terminal which is connected to junction e between resistors R10 and R11 then a current pulse will flow from the cathode of the unijunction transistor Q5 into the gate of the silicon controlled rectifier Q6 thus energizing it (Q6) and causing current to flow through the trip coil TC1 from either the rectifier output lead 34 or from a storage capacitor C4 This causes the circuit breaker CB to trip thus opening the separable main contacts A, B, and C and preventing further current from flowing in the lines φA, φB and φC. The time delay before the circuit breaker CB trips is proportional to the square root of the magnitude of the highest overload current flowing in the lines IA, IB and IC which may be between the limits of approximately 120% of overload current and 1000% of overload current.

OPERATION OF THE INSTANTANEOUS TRIP CIRCUIT IT

Since the voltage between the terminals 40 and 36 is proportional to the square root of the current flowing in the previously described leads or lines, the voltage drop at the wiper C of the potentiometer R5 in the voltage divider circuit comprising the resistors R4, R5 and R6 is also proportional thereto. When the voltage between wiper C and the terminal 36 is larger by at least two diode drops than the breakover voltage of the zener diode D5, then the transistors Q3 and Q4, which form a Darlington pair combination will conduct current from wiper 38 causing a triggering pulse to be delivered to silicon controlled rectifier Q6. When this happens, coil TC1 will be energized and a tripping operation of circuit breaker CB will occur. It can be seen that in this case, no time delay cycle will take place once the critical current value is reached in the line to be protected. In this case, tripping of the circuit breaker CB is almost instantaneous, or occurs at least within three or four cycles after the detection of the presence of overload current. This substantially instantaneous tripping may occur when the overload currents are generally greater than 500% overload but generally less than 1000% overload.

OPERATION OF THE SUPER INSTANTANEOUS TRIP CIRCUIT SIT

In the event that the overload current reaches a value generally greater than 1000 % of rated current, the zener diode DB will break down or conduct causing current to flow through the zener diode DB and the resistor R15 thus providing a signal or pulse to the gate of the silicon controlled rectifier Q6 causing energy to flow therethrough, thus energizing the trip coil TC1 and actuating the opening of the main contacts A, B, and C of the circuit breaker CB.

It is possible under certain conditions that the triggering signal may be delivered to the silicon controlled rectifier Q6 a small fraction of a millisecond before one of the transformers TAS, TBS, or TCS saturates. This could result in insufficient current flow from said transformers to either operate the trip coil TC1 or to hold transistor Q6 "on". For this reason, capacitor C4 is provided. As soon as silicon controlled rectifier Q6 turns on, capacitor C4 discharges through resistor R14 and the silicon controlled rectifier Q6. This assures holding Q6 on during the first half cycle after the start of energization of the trip coil TC1 so that the trip coil TC1 will definitely be completely energized after the start of the next half cycle. Capacitor C4 also provides $dv/dt$ or spurious noise protection for the silicon controlled rectifier Q6. Capacitor C4 is charged initially through the trip coil TC1 until the voltage across the capacitor C4 is generally equal to the voltage across the leads or terminals 34 and 36. Charging is accomplished through the diode D6 so that it may be accomplished quickly, but discharge of capacitor C4 is through resistor R14, bypassing the reverse biased diode D6.

Figure 12:
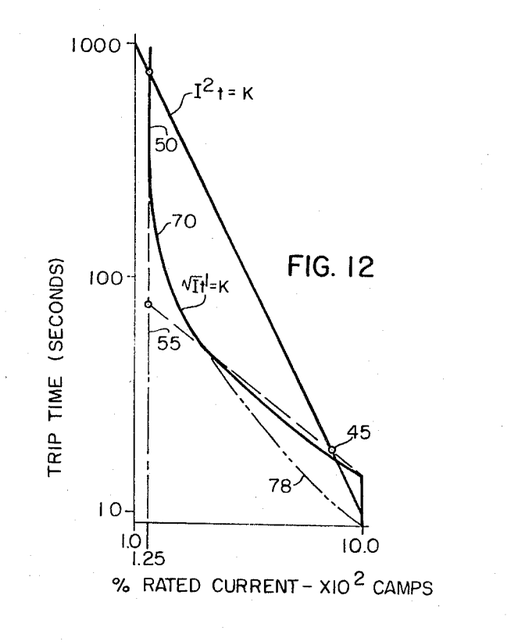
FIG. 12 shows a representative curve of tripping time versus current for the circuit of FIGS. 10 and 11.

Referring now to FIG. 12 a log-log plot or graph of percent rated current versus tripping time for the time delay circuit TD of FIG. 11 is shown. The ideal curve, designated $I^2t = a$, constant (K) is depicted. The curve $\sqrt{I}\,t = $ constant K is also shown. This latter curve represents the timing characteristics of the time delay circuit TD1. It can be seen that this curve intersects the ideal curve at one point 45. In addition, because of the threshold characteristics of the transistor Q1 and the relative position of the potentiometer wiper 38, no tripping may occur below an arbitrary or predetermined value of overload current which in this case is 125% overload but which may be any convenient value as desired. This is represented by the vertical line 50. Consequently, ideally the operation of the time delay circuit TD is represented by the curve the $\sqrt{I}\,t = $ constant and the curve 50 which intersects it at point 55. Consequently, it can be said that at at least two points 45 and 65, the tripping characteristics or values of the time delay circuit and the ideal circuit are equal. In actuality, the closeness of the time delay circuit timing out characteristics to that of the $I^2t = $ a constant (K) or ideal circuit is more closely approximated by the curved portion of the curve indicated at 70. This curved portion exists because the ideal characteristics of the $\sqrt{I}\,t = $ constant (K') curve and curve 50 cannot be practically met. This is due to the fact that the turn on time of transistor Q2 is not ideal. In determining the turn on characteristics of transistor Q2, it was assumed that the voltage between lines 40 and 36 was the only driving voltage for the current I2 which flows through capacitor C2, as depicted in FIG. 12. In actuality however, as the voltage value between the lines 40 and 36 approaches the voltage value between point a and line 36 of the voltage divider including resistors R9, R10 and R11, the approximation previously described becomes less accurate. This is the reason for the gently sloping curve in the region 70 in FIG. 11. Consequently, it can be seen that by using the time delay characteristics of circuit TD in FIG. 11, an approximation for the $I^2t = $ a constant (K) tripping characteristics which is desirable for circuit breakers can be provided. If it is desired to cause the timing characteristics of the time delay circuit TD to be more like that of the ideal timing characteristics as indicated by the $I^2t = $ a constant (K) line, then a resistor R7A and zener diode D7A may be connected serially with one another and with the series circuit connected in parallel with the resistor R7 of FIG. 11. This will generate the portion of the curve 78 shown in FIG. 12. The addition of more resistors and zener diodes in parallel with resistor R7 will provide for even better approximation of the ideal time delay curve $I^2t = K$.

Figure 13:
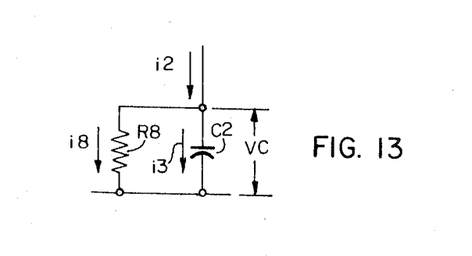
FIG. 13 shows a portion of the circuit of FIG. 11 for analytical purposes.

FIG. 13 shows a portion of the time delay circuit TD including the capacitor C2 and the resistor R8. Resistor R8 provides a discharge or reset path for the capacitor C2, in the event an overload is removed from the circuit breaker control system before tripping is begun. Otherwise, the resistor R8 is used to bypass any small leakage current which may flow in transistor Q2 when it is normally cut off or open. This prevents buildup of voltage across the capacitor C2 which might otherwise cause spurious tripping operations of the circuit breakers CB.

It is generally assumed with respect to the saturating transformers of the various embodiments that they saturate within less than 30 degrees of the current zero for all currents above 120 percent of rated current. It should also be noted that the peak voltages of a waveshape such as shown in FIG. 3 is independent of the number of turns on the current transformer secondary. Consequently, the turns can be chosen so as to provide sufficient current to acutate a trip coil even with a minimum 120 percent of rated current flowing through the lines to be protected. Also, since the coil impedances are low compared to the values of the core resistances, RAS, RBS and RCS, the current transformers will not saturate when the trip coil TC1 is actuated to a conducting condition or said in another way when current flows therethrough. The construction features of the saturating current transformers are important. It is assumed that the current transformer will be constructed of iron with substantially square loop magnetic characteristics or as close to that as possible. However, in practice it has been found that ordinary 14 mil silicon steel interleaved laminations will work satisfactorily for this purpose. The iron leaves should have little or no air gaps therein.

It is to be understood that although single phase and three-phase electrical systems are shown for purposes of illustration, the number and type of electrical conductors to be protected is relatively unimportant. It is also to be understood that although certain current ranges for tripping characteristics have been previously described, any current range provided may be changed to that which is deemed desirable. It is also to be understood that although sinusoidally shaped voltages and currents are desirable in the leads to be protected, slight deviations from the sinusoidal shape are allowable without appreciable effect on the control circuitry for the circuit breaker. It is also to be understood that although the trip units or trip elements have been described as containing both instantaneous and time delay tripping characteristics, in any of the embodiments described either one or the other may be used without the other. It is also to be understood that although certain types of transformer arrangements and current sensor arrangements have been described, other arrangements are possible which produce the same effects as described with respect to the embodiments. The type of current transformers for providing intelligence or information to the control circuitry need not be limited to those specifically described. It is also to be understood that the type of current sensors may be intermixed that is a Hall Generator for one phase may be used in the same control circuit where a non-saturating type transformer is used for another phase.

The apparatus and circuits embodying the teachings of this invention have many advantages. One advantage lies in the fact that in some embodiments of the invention, a single potentiometer adjustment is all that is required or necessary to adjust the entire circuit breaker system for changes in overload conditions on any or all the poles thereof and the need for replaceable trip units is thus eliminated. Another advantage lies in the fact that a breaker may have the same time currents and instantaneous trip characteristic in terms of percent of rated current regardless of the value of the rated current setting, or the type of fault anticipated. Another advantage lies in the fact that saturated current transformers are easily constructed to be small enough to allow an entire trip system to be fitted inside the breaker case of a molded case circuit breaker. Another advantage lies in the fact that saturating current transformers can be designed to provide sufficient energy to cause tripping of a circuit breaker even on low magnitude single phase faults. Another advantage lies in the fact that the voltage output of saturating current transformers can be limited to safe levels which will not damage the trip circuit or personnel thereby even on a very high fault current. Another advantage lies in the fact that the rated current of a breaker can be varied over a wide range by simply changing the dial setting of potentiometer RB. Another advantage lies in the fact that in some embodiments of the invention, very accurate discrimination between 100 percent rated current which is considered a no trip current level or characteristic and 125 percent of rated current which is considered a definite trip level or characteristic is achievable. Another advantage lies in the fact that the time delay trip time versus current can be made to closely approximate a classical $I^2t = $ a constant (K) curve. Another advantage lies in the fact that the disclosed trip circuits operate in a fraction of a millisecond on high fault currents, thus giving minimal trip times. Another advantage lies in the fact that changes in ambient temperature and other environmental factors have a negligible effect on the trip circuit. Thus the trip characteristic is more accurate and has greater repeatability than those using thermal magnetic characteristics. Another advantage lies in the fact that the trip circuit is relatively simple. Another advantage can be found in those embodiments in which the current sensing components are separate from the current transformers which supply power to the circuit. This allows the whole system to be relatively much smaller, and usually less expensive. Another advantage lies in the fact that negligible loading is placed on the current sensors. Another advantage lies in the fact that a generally linear relationship exists between the line current and the current in the trip element over a wide range of line currents. Another advantage lies in the fact that the current in the trip element is essentially pure DC in some embodiments of the invention. Another advantage lies in the fact that calibration of the trip element can be made simple and rapid because high currents are not required for calibration. Another advantage lies in the fact that the calibration resistor RB can be replaced or changed easily. Another advantage lies in the fact that the timing unit does not load the current transformers and other sensors.

What I claim is:

1. An electrical protective system for use with an electrical power system including at least one conductor, comprising:

a saturating current transformer means having output terminals and having a predetermined number of secondary turns for monitoring alternating electrical current in said conductor to thereby provide a combination power-intelligence signal at said output terminals, a core resistor means connected across said secondary turns of said saturating current transformer means, said saturating current transformer means being non-saturated within thirty electrical degrees of said alternating current zero so that said power-intelligence signal has a non-saturated position;

an electrical control circuit having a set of input terminals for being electrically connected in circuit relationship with said output terminals of said saturating current transformer means, said electrical control circuit having output terminal said electrical control circuit having means therein for anticipating the maximum absolute value of said alternating current during any half cycle thereof when energized by said non-saturated portion of said power-intelligence signal to provide an actuating signal at said output terminal of said electrical control circuit for useful purposes; and electrical protective means including coil means of predetermined resistance value, said protective means having input terminals which are connected in circuit relationship with said output terminals of said electrical control circuit, said coil means being connected in circuit relationship with said output terminal of said saturating current transformer means, said electrical protective means responding to the presence of said actuating signal from said electrical control circuit to enable said protective means to thereafter be energized by power from said output terminals of said saturating current transformer means being supplied to said coil means to thereby cause a change in the magnitude of said alternating electrical current in said electrical conductor when said alternating electrical current reaches a predetermined value, said predetermined resistance value of said coil means being low compared to said resistance value of said core resistor means and said predetermined number of said secondary turns of said current transformer means being sufficient in magnitude to provide sufficient electrical power to energize said coil means from said current transformer means at a predetermined value within a range of 120 percent of overload or larger for said alternating current in said conductor, said predetermined number of said secondary turns being of such a value as to by necessity cause saturation in said current transformer means within said thirty degrees of current zero.

2. The combination as claimed in claim 1 wherein said electrical protective means comprises a circuit breaker including trip means, said circuit breaker having separable main contacts electrically connected to said electrical conductor, said intelligence signal enabling said trip means to thereby cause actuation of said circuit breaker to thereby open said separable main contacts to thereby interrupt said electrical current.

3. An electrical protective system for use with an electrical power system having at least one electrical conductor comprising:

a saturating electrical transformer for monitoring alternating electrical current in said electrical conductor and having output terminals which are electrically connected to the input terminals of a full wave bridge rectifier, the magnitude of said alternating current in said electrical conductor during overload current conditions being periodically larger for a certain portion of each half cycle of alternating current than the magnitude of current necessary to saturate said saturating current transformer thereby providing electrical voltage to said rectifier input terminals for only a portion of each half cycle of said alternating current, the output terminals of said full wave bridge rectifier having connected thereacross a filter capacitor, said full wave bridge rectifier providing unidirectional electrical voltage to said filter capacitor, said filter capacitor being adapted to provide pulsating unidirectional electrical power to an electrical control circuit primarily for the purpose of energizing said electrical control circuit;

current sensing means having output terminals and being adapted to monitor said time varying electrical current in said electrical conductor to thereby provide an output intelligence signal at said output terminals which signal is related to the magnitude of said electrical current;

an electrical control circuit having first and second sets of input terminals, said first set of input terminals being electrically connected in circuit relationship with said filter capacitor so that said electrical power may be provided to said electrical control circuit for said purpose of energizing said electrical control circuit, said second set of input terminals being electrically connected in circuit relationship with said output terminals of said current sensing means so that said output intelligence signal may be provided to said electrical circuit for supplying said intelligence signal thereto; and electrical protective means connected in circuit relationship with said electrical control circuit, said protective means responding to the presence of said intelligence signal and thereby with the aid of said energizing electrical power provided to said electrical control circuit changing the magnitude of said electrical current in said electrical conductor after said electrical current attains a predetermined value.

4. The combination as claimed in claim 3 wherein said electrical protective means comprises an electrical circuit breaker including trip means electrically connected to said electrical control circuit, said circuit breaker having separable main contacts electrically connected to said electrical conductor, said intelligence signal actuating said trip means to thereby actuate said circuit breaker to open said separable main contacts to thereby change the magnitude of said electrical current to substantially zero.

5. The combination as claimed in claim 4 wherein said trip means comprises means for generally instantaneously actuating said circuit breaker to open said separable main contacts when said predetermined value of said electrical current in said electrical conductor is reached.

6. The combination as claimed in claim 4 wherein said trip means comprises means for generally delaying for a predetermined time said opening of said separable main contacts after said predetermined value of said electrical current in said electrical conductor is attained.

7. The combination as claimed in claim 6 wherein said trip means additionally comprises means for generally instantaneously causing said separable main contacts to open when a second predetermined value of electrical current in said electrical conductor is attained.

8. The combination as claimed in claim 7 comprising a potentiometer with fixed input terminals and a movable output terminal, said fixed terminals of said potentiometer being connected to said output terminals of said current sensing means so that said output intelligence signal may provide a voltage signal thereacross which is proportional to said magnitude of said electrical current in said electrical conductor, said second set of input terminals of said electrical circuit being connected to the movable terminal of said potentiometer and one fixed terminal thereof respectively, so that the level of said intelligence signal provided to said electrical circuit may be adjusted for calibration to thereby select said predetermined value of electrical current in said electrical conductor at which said trip unit will respond to change the magnitude thereof to zero by actuating said circuit breaker.

9. A circuit breaker for use with an electrical power system having at least one electrical conductor comprising:

separable main contacts adapted to be connected to an electrical conductor of an electrical power system, a saturating electrical transformer for monitoring alternating electrical current in said electrical conductor and having output terminals which are electrically connected to the input terminals of a full wave bridge rectifier, the magnitude of said alternating current in said electrical conductor during overload current conditions being periodically larger for a certain portion of each half cycle of alternating current than the magnitude of current necessary to saturate said saturating current transformer thereby providing electrical voltage to said rectifier input terminals for only a portion of each half cycle of said alternating current, the output terminals of said full wave bridge rectifier having connected thereacross a filter capacitor, said full wave bridge rectifier providing unidirectional electrical voltage to said filter capacitor, said filter capacitor being adapted to provide pulsating unidirectional electrical power to an electrical control circuit primarily for the purpose of energizing said electrical control circuit;

current sensing means having output terminals and being adapted to monitor said time varying electrical current in said electrical conductor to thereby provide an output intelligence signal at said output terminals signal which is related to the magnitude of said electrical current;

an electrical control circuit having first and second sets of input terminals, said first set of input terminals being electrically connected to circuit relationship with said filter capacitor so that said electrical power may be provided to said electrical control circuit for said purpose of energizing said electrical control circuit, said second set of input terminals being electrically connected in circuit relationship with said output terminals of said current sensing means so that said output intelligence signal may be provided to said electrical circuit for supplying said intelligence signal thereto; and electrical protective means connected in circuit relationship with said electrical control circuit, said protective means responding to the presence of said intelligence signal and thereby with the aid of said energizing electrical power provided to said electrical control circuit actuating movement of said separable main contact thus changing the magnitude of said electrical current in said electrical conductor after said electrical current attains a predetermined value.

10. An electrical protective system for use with an electrical power system having at least one electrical conductor comprising:

a saturating electrical transformer for monitoring alternating electrical current in said electrical conductor and having output terminals which are electrically connected to the input terminals of a full wave bridge rectifier, the magnitude of said alternating current in said electrical conductor during overload current conditions being periodically larger for a certain portion of each half cycle of alternating current than the magnitude of current necessary to saturate said saturating current transformer thereby providing electrical voltage to said rectifier input terminals for only a portion of each half cycle of said alternating current, the output terminals of said full wave bridge rectifier having connected thereacross a filter capacitor, said full wave bridge rectifier providing unidirectional electrical voltage to said filter capacitor, said filter capacitor being adapted to provide pulsating unidirectional electrical power to an electrical control circuit primarily for the purpose of energizing said electrical control circuit;

current sensing means having output terminals and being adapted to monitor said time varying electrical current in said electrical conductor to thereby provide an output intelligence signal at said output terminals which signal is related to the magnitude of said electrical current; and an electrical control circuit having first and second sets of input terminals, said first set of input terminals being electrically connected in circuit relationship with said filter capacitor so that said electrical power may be provided to said electrical control circuit for said purpose of energizing said electrical control circuit, said second set of input terminals being electrically connected in circuit relationship with said output terminals of said current sensing means so that said output intelligence signal may be provided to said electrical circuit for supplying said intelligence signal thereto, said intelligence signal and said electrical power thence being providable to electrical protective means adapted to be connected in circuit relationship with a portion of said electrical control circuit, said electrical protective means being of the type which is adapted to respond to the presence of said intelligence signal and said power signal to thereby change the magnitude of said electrical current in said electrical conductor after said electrical current attains a predetermined value.

* * * * *